United States Patent [19]

Pruden et al.

[11] Patent Number: 4,908,341

[45] Date of Patent: Mar. 13, 1990

[54] METHOD FOR REACTIVATING SPENT CATALYST BY CONTACT WITH ONE OR MORE AROMATIC COMPOUNDS

[75] Inventors: Ann L. Pruden, Bellemead; Chaya Venkat, Princeton; Darrell D. Whitehurst, Titusville, all of N.J.

[73] Assignee: Mobil Oil Corp., New York, N.Y.

[21] Appl. No.: 110,318

[22] Filed: Oct. 20, 1987

Related U.S. Application Data

[63] Continuation-in-part of Ser. No. 937,951, Dec. 4, 1986, abandoned.

[51] Int. Cl.⁴ .................. B01J 29/38; B01J 38/58; B01J 38/56; C10G 47/20
[52] U.S. Cl. .................. 502/30; 208/111; 208/120; 502/31; 502/53; 518/710; 585/407; 585/466; 585/467
[58] Field of Search .................. 502/30, 31, 53

[56] References Cited

U.S. PATENT DOCUMENTS

| | | | |
|---|---|---|---|
| 2,541,044 | 12/1947 | Daugherty | 502/31 |
| 3,375,293 | 3/1968 | Breckoff et al. | 502/31 |
| 3,412,013 | 11/1968 | Bowles | 208/120 |
| 3,505,206 | 4/1970 | Decker | 502/31 |
| 3,591,522 | 7/1971 | Cosyns et al. | 502/30 |
| 3,851,004 | 11/1974 | Yang | 502/30 |
| 4,008,291 | 2/1977 | Zabransky et al. | 502/30 |
| 4,118,338 | 10/1978 | Gross et al. | 208/120 |
| 4,144,189 | 3/1979 | Kirkbride | 208/113 |
| 4,317,712 | 3/1983 | Farcasiu | 208/46 |

*Primary Examiner*—Paul E. Konopka
*Attorney, Agent, or Firm*—Alexander J. McKillop; Charles J. Speciale; Dennis P. Santini

[57] ABSTRACT

A method for regenerating a spent porous crystalline catalyst, optionally associated with a metal component such as noble and/or base metal(s), is described. The method comprises contacting the spent catalyst which has become deactivated by accumulation of carbonaceous residue with one or more light aromatic compounds under conditions resulting in reactivation of said catalyst. The light aromatic compounds employed are ones which have the capability of penetrating the catalyst, so as to contact the carbonaceous residue contained therein, undergoing alkylation by alkyl fragments contributed by components of the carbonaceous residue and diffusing from or otherwise escaping the catalyst.

27 Claims, No Drawings

METHOD FOR REACTIVATING SPENT CATALYST BY CONTACT WITH ONE OR MORE AROMATIC COMPOUNDS

CROSS-REFERENCE TO RELATED APPLICATIONS

This is a Continuation-in-Part of commonly assigned U.S. Patent Application Ser. No. 937,951, filed Dec. 4, 1986, now abandoned.

BACKGROUND OF THE INVENTION

This invention relates to a method for reactivating spent catalyst. The method is generally applicable to the reactivation of any porous, crystalline catalyst material used in any hydrocarbon conversion operation wherein such catalyst eventually becomes inactive through the accumulation of carbonaceous residue within its pores, or channels. The term "porous" as used herein is intended to apply to such materials having pore openings not greater than about 15 angstroms and more generally possessing pore openings within the range of from about 4 to about 8 angstroms.

The method of this invention is especially useful in reactivating any of a variety of porous, crystalline metallophosphate catalysts and metallosilicate zeolite catalysts encountered in such refinery operations as cracking, conversion of methanol to gasoline, conversion of olefins to gasoline and distillate range hydrocarbons, isomerization, disproportionation, reforming, hydroforming, hydrotreating, hydrodewaxing, and the like. At some time during the use of the catalyst, the accumulation of carbonaceous residue within the pores, or channels, of the catalyst reaches the point where its further use becomes impractical. The thus spent catalyst must then be subjected to reactivation treatment to restore its activity. Typically, reactivation of the spent catalyst involves contact with hydrogen at temperatures ranging from 900° F. to 1000° F., high hydrogen flow rates (about 25,000, SCF/bbl cat-hr) and contact times of 24 hours or so. However, hydrogen reactivation does not always completely restore the original level of activity of the catalyst. For example, it has been observed that following hydrogen reactivation of an HZSM-5 catalyst, the loss in cycle length for a catalytic dewaxing operation was substantially less than the original cycle length. The number of days the catalyst can remain on stream decreases from cycle to cycle and eventually continued reactivation becomes impractical.

While air (oxygen) regeneration can be effective to rid the catalyst of hydrocarbon residues, a decrease in cycle length has also been observed. Where the catalyst contains a metal component, e.g., a hydrogenation-dehydrogenation noble metal such as platinum or palladium and/or a base metal such as nickel, air regeneration can result in still other problems such as metal sintering and agglomeration.

SUMMARY OF THE INVENTION

It is an object of the present invention to provide a method for reactivating a spent porous crystalline catalyst, optionally associated with a metal component, which avoids the disadvantages experienced with reactivating spent catalyst with hydrogen and/or regenerating with oxygen in accordance with known procedures.

In furtherance of this and other objects of the invention, a method for regenerating a spent porous crystalline catalyst is provided which comprises contacting the spent catalyst which has become deactivated by accumulation of carbonaceous residue with one or more light aromatic compounds under conditions resulting in reactivation of said catalyst.

Without wishing to be bound, it is speculated that one of the major factors contributing to catalyst aging in a porous crystalline catalyst is a loss of diffusivity of materials into and/or out of the pore system due to the presence of alkylaromatic compounds which have formed within the catalyst during its cycle of operation. Because of their unfavorable geometries, it is difficult for these alkylaromatics to diffuse out of the catalyst so they tend to remain there. Under the conditions of this invention whereby the spent catalyst is contacted with light aromatic compound(s), it is speculated that hydrogen-rich alkyl side chains of aromatic components contained in the carbonaceous residue transfer to the added light aromatic compound(s), i.e., "transalkylation" occurs. Both the resulting alkylated light aromatic compound(s) and the dealkylated alkyaromatics are then free to diffuse out of the catalyst resulting in its reactivation.

It will be recognized by one skilled in the art that the foregoing explanation is most likely an oversimplification in view of the complex phenomena involved in catalyst deactivation/reactivation. Nonetheless, it is phenomenologically compatible with the results obtained. This is supported by the observation that light aromatic hydrocarbons emerge from the operation as higher molecular weight, alkylated materials. Whatever may, in fact, be the actual chemical mechanism(s) involved, it remains that the reactivation method herein is effective for restoring the activity of porous, crystalline catalysts.

DESCRIPTION OF THE PREFERRED EMBODIMENTS

The catalysts which are advantageously reactivated in accordance with the method of this invention are crystalline metallophosphates and metallosilicate zeolites of relatively large or medium pore size. Metallophosphate catalysts which can be reactivated by the method of this invention include the aluminophosphates described in U.S. Pat. Nos. 4,310,440 and 4,385,994 and the silico alumino phosphates described in U.S. Pat. No. 4,440,871. Suitable metallosilicate zeolites include zeolite Z (U.S. Pat. No. 2,882,243), zeolite X (U.S. Pat. No. 2,882,244), zeolite Y (U.S. Pat. No. 3,130,007), zeolite Beta (U.S. Pat. No. 3,308,069), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-23 (U.S. Pat. No. 4,076,842), zeolite ZSM-35 (U.S. Pat. No. 4,016,245), zeolite ZSM-38 (U.S. Pat. No. 4,046,859), zeolite ZSM-35 (U.S. Pat. No. 4,016,245), zeolite ZSM-48 (U.S. Pat. No. 4,375,573), merely to name a few. Zeolites containing a framework element other than, or in addition to, aluminum e.g., boron, iron, titanium, zirconium, gallium, germanium, and the like, are also suitable for reactivation in accordance with the method herein. Such zeolites are known from, inter alia, U.S. Pat. Nos. 3,328,119; 3,329,480; 3,329,481; 4,414,423; and, 4,417,088.

The method of this invention especially contemplates the reactivation of a medium pore aluminosilicate zeolite, e.g., ZSM-5, ZSM-11, ZSM-12, ZSM-23, ZSM-35, ZSM-38, and the like, containing a hydrogenation-dehydrogenation component, e.g., a noble metal such as platinum, or palladium, a base metal such as nickel, tungsten, etc., or combination of noble metal and base metal. These and the crystalline silicate zeolite catalysts generally can be unbound, self-bound or composited with a binder such as silica, alumina, silica-alumina, etc.

The source of the spent porous crystalline catalyst can be any one of numerous conversion processes which result in a progressive loss of catalytic activity due to the accumulation of carbonaceous residues containing pore-plugging alkylaromatic component(s). Such conversion processes include, as non-limiting examples, cracking hydrocarbons with reaction conditions including a temperature of from about 250° C. to about 700° C., a pressure of from about 0.1 atmosphere (bar) to about 30 atmospheres and a weight hourly space velocity of from about 0.1 to about 100; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400. and a hydrogen/hydrocarbon mole ratio of from about 0 to about 20; converting olefins to aromatics, e.g., benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g., methanol, ethanol, Fischer-Tropsch product, or ethers, e.g., dimethylether, or mixtures thereof, to hydrocarbons including aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components with reaction conditions including a temperature of from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g., benzene and alkylbenzenes, in the presence of an alklyating agent, e.g. olefins, formaldehyde, alkyl halides and alcohols, with reaction conditions including a temperature of from about 50° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; distillate dewaxing of gas oil, coker tower bottoms, fraction reduced crude, vacuum tower bottoms, vacuum resids, etc., with reaction conditions including a temperature of from about 450° F. to about 930° F., a pressure of about 100 to 3000 psig, a partial pressure of hydrogen of about 2300 psig or less and a hydrogen/feedstock ratio of about 100 to about 20,000 SCF/bbl, and an LHSV of from about 0.1 to about 20 LHSV; and, lube dewaxing of various lube stocks such as light neutral, heavy neutral and bright stocks with reaction conditions including a temperature of from about 450° F. to about 750° F., a pressure of from about 100 psig to about 2000 psig, an LHSV of from about 0.1 to about 10, and a hydrogen/feedstock ratio of about 200 to about 8000 SCF/bbl.

The light aromatic compound to be contacted with th spent catalyst must satisfy three requirements: it must be able to penetrate the catalyst so as to contact the carbonaceous residue contained therein, it must be capable of undergoing alkylation by alkyl fragments contributed by component(s) of the carbonaceous residue and, as alkylated, it must be capable of diffusing from, or otherwise getting out of, the catalyst.

Useful light aromatic compounds or mixtures thereof will usually possess boiling points not higher than about 220° C., and preferably not higher than about 150° C. The light aromatic compound or mixture thereof selected is contacted with the spent catalyst in the amount ranging from about 0.2 to about 40 weight percent, and preferably from about 0.5 to about 15 weight percent, of the carbonaceous residue. Suitable aromatic hydrocarbons include benzene, toluene, o-, m- and p-xylene, ethylbenzene, isopropylbenzene, butylbenzene and mixtures thereof. Benzene, toluene and the xylenes are especially preferred.

The spent catalyst is contacted with the light aromatic compound(s) at atmospheric or higher pressure up to 1500 psig for from about 1 hour to about 200 hours, preferably from about 20 to about 100 hours, at a temperature from about 600° F. to about 1200° F., preferably from about 700° F. to about 1000° F. Hydrogen is preferably present during reactivation. The precise pressure and temperature of the reactivation treatment and its duration are determined largely by the amount and kind of spent catalyst to be reactivated, the amount and chemical composition of the carbonaceous residue, the nature of the light aromatic compound(s) contacted with the spent catalyst and whether hydrogen is present. Optimum reactivation conditions for particular situations can readily be determined by routine testing.

During the reactivation procedure herein, dealkylated aromatic components are desorbed from the catalyst and carried away therefrom in the alkylated light aromatic stream. If desired, this mixture of dealkylated and alkylated aromatic products can be employed directly in other uses, e.g., as fuel, as blending components for gasoline solvent, etc., or it can be resolved into individual compounds and/or fractions having similar uses or use as intermediates for a variety of industrially important syntheses. Thus, the method of this invention is not only to be considered as a method for reactivating a spent porous crystalline catalyst, but also as a method for converting light aromatics by alkyl transfer to alkylaromatic compounds.

Although spent, porous, crystalline catalysts resulting from any of the conversion processes described above as well as from other types of conversions can be suitably reactivated by the method of this invention, the invention will be more particularly described in connection with the reactivation of a metal-containing aluminosilicate zeolite of medium pore size, namely Ni-ZSM-5, resulting from a catalytic hydrodewaxing operation. Catalytic dewaxing employing medium pore zeolites is known from, among others, U.S. Pat. Nos. 3,700,585 (Reissue No. 28,398); 3,894,938; 4,176,050; 4,181,598; 4,222,855; 4,229,282; 4,247,388; and, 4,560,469.

EXAMPLE 1

This example illustrates the reactivation of a spent Ni-ZSM-5 catalyst obtained from the isothermal dewaxing of a heavy neutral raffinate feedstock.

A. Catalyst Aging Under Isothermal Dewaxing Conditions

Dewaxing was carried out in a microreactor having a length to diameter ratio of about 10. The catalyst was steamed Ni-ZSM-5 1/16" extrudate crushed and sized to 20/40 mesh. The fresh catalyst was presulfided in situ at 400° F. and 400 psig with 2.3% of $H_2S$ for 1 hour. All of the dewaxing runs were carried out at 300° C., 1 LHSV, 400 psig and a hydrogen/feedstock ratio of 2500 SCF/bbl.

FIG. 1 shows the isothermal aging profile of the catalyst. The reactor temperature was held constant at 300° C. and the pour point of the lube product was allowed to drift upward as the catalyst lost activity. (In ordinary practice, product pour point is held constant and the reactor temperature is increased as necessary to accomplish this.) Over a period of 12.5 days on stream, the pour point of the product changed from 10° F. to 75° F. indicating substantial deactivation of the catalyst.

B. Catalyst Reactivation

Before each reactivation discussed below was carried out, the feed was discontinued and the temperature was dropped to 200° C. The feed system, reactor, catalyst and collection vessels were thoroughly cleaned of traces of feed by rinsing with toluene at 200° C.

The temperature of the reactor was gradually raised, over a period of an hour, to 371° C. Reactivation with toluene as the light aromatic feed was carried out at 1 LHSV, 400 psig and 2500 SCF/barrel of hydrogen for a period of 43 hours. At the end of this period, the reactivation was halted. The toluene feed was replaced with heavy neutral raffinate feedstock and the catalyst brought back on stream. FIG. 2 shows the effect of the toluene reactivation. The pour point of the first sample of product after reactivation was 42° F., a change of 33° F. from the pour point just before reactivation. The catalyst was kept on stream in this second cycle of isothermal dewaxing until the pour point again reached 75° F., a process which took 6 days on stream. At the end of the second cycle, the catalyst was subjected to hydrogen reactivation under identical temperature conditions as the toluene reactivation. At the end of the 43 hour hydrogen reactivation, the catalyst was brought back on stream with the heavy neutral raffinate feedstock. FIG. 3 shows the efficiency of this hydrogen reactivation procedure. The pour point on the first day of this third cycle was 58° F., an improvement of only 17° F., compared to the 33° F. observed for toluene reactivation under identical conditions.

EXAMPLE 2

The Ni-ZSM-5 catalyst of Example 1 was again aged to an 83.3° F. pour point product employing substantially the same isothermal dewaxing conditions set forth in that example. Reactivation of the deactivated catalyst was then carried out employing benzene a the light aromatic stream. Reactivation was carried out at 800° F. for a period of 48 hours. At the end of the reactivation procedure, the catalyst was brought back on stream with the same heavy neutral raffinate used in aging the catalyst at 572° F. (FIG. 4). The pour point on the first day on stream was 29.6° F., an improvement of about 54° F. over that provided by the spent catalyst.

EXAMPLE 3

Over a period of 8 days, the Ni-ZSM-5 catalyst of Example 2 was aged back to a product pour point of 14° F. Regeneration was carried out with benzene at 900° F. over a period of 46 hours. Dewaxing was resumed with the same heavy neutral raffinate feedstock as before, but in place of the isothermal dewaxing conditions of Examples 1 and 2, the pour point of the product was held to a target value of 20° F. and the temperature was increased to achieve this value. The corrected reactor temperature plotted against days on stream in this dewaxing procedure are shown in FIG. 5. For comparison purposes, the results of a separate dewaxing procedure on fresh Ni-ZSM-5 catalyst under identical conditions are also shown in FIG. 5. Although the reactivated catalyst aged rapidly for the first two days, after this initial period, the catalyst stabilized and the aging rates of the fresh and reactivated catalyst were very similar. After 16 days on stream, the aging rate decreased sharply to about 1.5° F./day. This was maintained until the twenty-sixth day when the corrected reactor temperature reached the ceiling value of 675° F. and the dewaxing operation was terminated. By contrast, the cycle length of the fresh, first cycle catalyst was only, 23 days.

EXAMPLE 4

This example illustrates the reactivation of spent Ni-ZSM-5 catalysts which had become deactivated while cracking n-dodecane at 289° C., 400 psi total pressure and 50 atm cc $H_2$/min. The example also demonstrates the advantage of carrying out the reactivation procedure herein in the presence of hydrogen over reactivation with hydrogen alone. In order to accelerate catalyst aging, 1-methylnapthalene (1-MeN) was included in the n-dodecane feed stream. It is believed that 1-MeN undergoes reaction during cracking and other conversion processes, including dewaxing, to more highly alkylated aromatic products which then become trapped inside the zeolite pore system blocking access to the catalytically active acid sites.

Reactivations of the 1-MeN deactivated catalysts were performed at 427° C. for 19 hours with benzene/$H_2$ mixture (0.5 LHSV benzene/17.3 atm cc/min $H_2$) and $H_2$ alone at 17.3 atm cc/min. The results are compared graphically in FIGS. 6 and 7. The addition of 2 wt% 1-MeN reduced the conversion of the n-dodecane feed to less than 5% in 100 hours.

Neither washing with pure n-dodecane at reaction temperature (289°) nor washing with benzene at 200° C. restored any cracking activity to the catalyst (FIG. 1). However, after treatment with the benzene/hydrogen mixture at 427° C. as described above, the catalyst had recovered >99% conversion of n-dodecane at 2 LHSV. At 4 LHSV, the activity level was 82%.

In the treatment of similarly deactivated Ni-ZSM-5 catalyst with hydrogen at identical time, temperature, flow conditions, the resulting conversion of n-dodecane at 4 LHSV was 68% compared to the fresh catalyst activity of 90% (FIG. 2). The hydrogen-reactivated catalyst at 2 LHSV had an activity of 83%. The data are set forth in the following Table.

TABLE

ADVANTAGE OF BENZENE AND HYDROGEN OVER HYDROGEN ALONE FOR REACTIVATION OF SPENT CATALYST

| | Conversion of n-dodecane % | | | |
|---|---|---|---|---|
| LHSV | Fresh Catalyst | Reactivation With Benzene (Bz) and $H_2$ | Reactivation with $H_2$ alone | Bz-$H_2$'% |
| 2 | 99 | 99 | 83 | $\geq 17$ |
| 4 | 90 | 82 | 68 | 14 |

As these data show, reactivation with benzene-$H_2$ over reactivation with $H_2$ alone under identical reactivation conditions resulted in 14–>$\geq$17% higher n-dodecane conversion.

What is claimed is:

1. A method for regenerating a spent porous crystalline zeolite catalyst which comprises contacting the spent catalyst, which has become deactivated by accumulation of carbonaceous residue during dewaxing, with one or more light aromatic compounds at temperature between 700° F. to 1200° F. under conditions resulting in reactivation of said catalyst, said light aromatic compound having a boiling point not higher than about 220° C. and the capability of penetrating the catalyst, so as to contact the carbonaceous residue contained therein, undergoing alkylation by alkyl fragments contributed by components of the carbonaceous residue and diffusing from or otherwise escaping the catalyst.

2. The method of claim 1 wherein the spent catalyst is a porous crystalline metallosilicate zeolite catalyst.

3. The method of claim 2 carried out in the presence of hydrogen.

4. The method of claim 2 wherein the porous crystalline metallosilicate zeolite catalyst is a large or medium pore size crystalline metallozeolite catalyst.

5. The method of claim 4 wherein the large pore size crystalline silicate zeolite catalyst is selected from the group consisting of zeolite beta, ZSM-4, zeolite X and zeolite Y.

6. The method of claim 6 wherein the large pore size crystalline metallosilicate zeolite catalyst contains a framework element other than, or in addition to, aluminum.

7. The method of claim 6 wherein the framework element is selected from the group consisting of boron, iron, titanium, zirconium, gallium and germanium.

8. The method of claim 4 wherein the large pore size crystalline metallosilicate zeolite catalyst contains at least one catalytically active metal.

9. The method of claim 8 wherein the metal is selected from the group consisting of noble metals, base metals and any combination thereof.

10. The method of claim 9 wherein the noble metal is selected from the group consisting of platinum, palladium, rhodium and iridium and the base metal is selected from the group consisting of cobalt, nickel and tungsten.

11. The method of claim 4 wherein the medium pore size crystalline metallosilicate zeolite catalyst is selected from the group consisting of ZSM-5, ZSM-11, ZSM-12, ZSM-22, ZSM-23, ZSM-35, ZSM-38, ZSM-48 and ZSM-50.

12. The method of claim 4 wherein the medium pore size crystalline metallosilicate zeolite catalyst contains a framework element other than, or in addition to, aluminum.

13. The method of claim 8 wherein the framework element is selected from the group consisting of boron, iron, titanium, zirconium, gallium and germanium.

14. The method of claim 4 wherein the medium pore size crystalline metallosilicate zeolite catalyst contains at least one catalytically active metal.

15. The method of claim 14 wherein the metal is selected from the group consisting of noble metals, base metals and any combination thereof.

16. The method of claim 15 wherein the noble metal is selected from the group consisting of platinum, palladium, rhodium and iridium and the base metal is selected from the consisting of cobalt, nickel and tungsten.

17. The method of claim 1 wherein the carbonaceous residue contains one or more alkylaromatic compounds which do not readily diffuse from the catalyst.

18. The method of claim 17 wherein contact of the carbonaceous residue with light aromatic compound(s) results in the dealkylation of at least a portion of said alkylaromatic compounds present in said residue accompanied by a alkylation of at least a portion of said light aromatic compound(s).

19. The method of claim 2 wherein the carbonaceous residue contains one or more alkylaromatic compounds which do not readily diffuse from the catalyst.

20. The method of claim 19 wherein contact of the carbonaceous residue with light aromatic compound(s) results in the dealkylation of at least a portion of said alkylaromatic compounds present in said residue accompanied by alkylation of at least a portion of said light aromatic compound(s).

21. The method of claim 2 wherein the source of the spent catalyst is a distillate dewaxing process.

22. The method of claim 2 wherein the source of the spent catalyst is a lube dewaxing process.

23. The method of claim 2 wherein the light aromatic compound or mixture thereof possesses a boiling point not higher than about 150° C.

24. The method of claim 2 wherein the light aromatic compound is selected from the group consisting of benzene, toluene, xylene and mixtures thereof.

25. The method of claim 2 wherein the light aromatic compound or mixture thereof is contacted with the spent catalyst at atmospheric pressure up to 1500 psig.

26. The method of claim 2 wherein the light aromatic compound or mixture thereof is contacted with the spent catalyst for from about 1 hour to about 200 hours.

27. The method of claim 2 wherein the light aromatic compound or mixture thereof is contacted with the spent catalyst at a temperature from about 700° F. to about 1000° F.

* * * * *

UNITED STATES PATENT AND TRADEMARK OFFICE
CERTIFICATE OF CORRECTION

PATENT NO.   :   4,908,341

DATED        :   3/13/90

INVENTOR(S)  :   A.L. Pruden et al

It is certified that error appears in the above-identified patent and that said Letters Patent is hereby corrected as shown below:

| | |
|---|---|
| Col. 4, line 8 | "th" should be --the-- |
| Col. 5, line 63 | "a" should be --as-- |
| Col. 6, line 6 | "14°" should be --74°-- |
| Col. 7, line 42, claim 6 | "claim 6" should be --claim 4-- |

Signed and Sealed this

Fourth Day of June, 1991

Attest:

HARRY F. MANBECK, JR.

*Attesting Officer*           *Commissioner of Patents and Trademarks*